(No Model.)

J. H. CULVER.
WATER MOTOR.

No. 305,575. Patented Sept. 23, 1884.

Witnesses,
Geo. H. Strong
G. A. Kouse

Inventor
Jas. H. Culver
By Dewey & Co.
Attorneys

UNITED STATES PATENT OFFICE.

JAMES H. CULVER, OF SAN FRANCISCO, CALIFORNIA, ASSIGNOR OF ONE-HALF TO W. H. WIESTER, OF SAME PLACE.

WATER-MOTOR.

SPECIFICATION forming part of Letters Patent No. 305,575, dated September 23, 1884.

Application filed April 24, 1884. (No model.)

*To all whom it may concern:*

Be it known that I, JAMES H. CULVER, of the city and county of San Francisco, and State of California, have invented an Improvement in Water-Motors; and I hereby declare the following to be a full, clear, and exact description thereof.

My invention relates to an improved wheel or motor; and it consists in a novel construction of a wheel and buckets which can be stamped from a single sheet or plate, a means for mounting it within a case, to prevent leakage around the shaft, and a means for supplying water to drive the wheel, together with details of construction, all of which will be more fully explained by reference to the accompanying drawings, in which—

Figure 1:
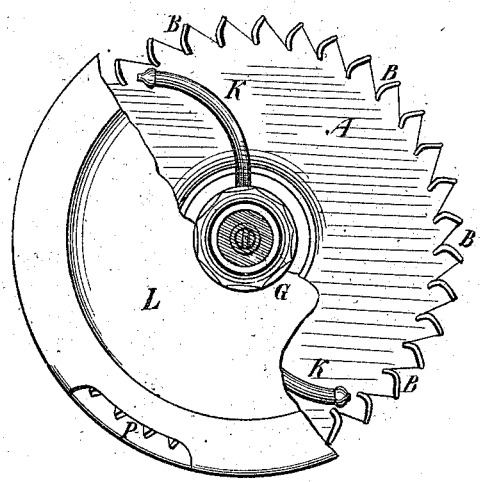
Figure 2:
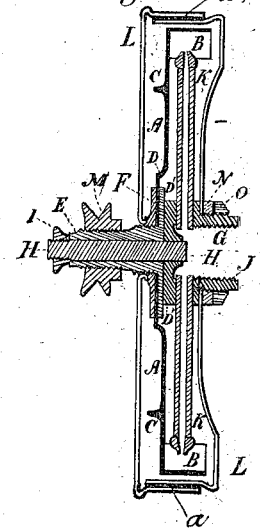
Figure 3:
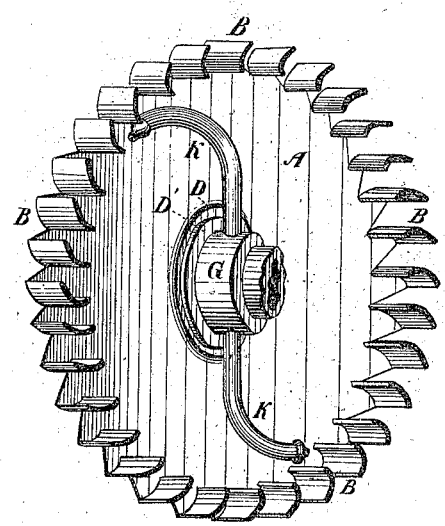

Figure 1 is a side view showing the wheel and water-supply arms and a part of the exterior case. Fig. 2 is a vertical section taken through the plane of the axis. Fig. 3 is a perspective view of the wheel, showing the water-supply arms.

A is the disk of my wheel, with the buckets B, which are first formed by cutting slits into the circumference of the metal wheel-blank. These slits are preferably made in lines tangential to a circle of smaller diameter within the disk. The blank is then placed in a die, and by a blow or pressure the buckets are bent so as to project at right angles from one side of the disk, and are at the same time curved or made concave toward the point from which the stream of water is to strike them, as shown in Figs. 1 and 3. The disk A is strengthened by striking up or forming a projecting ring, C, and the central portion is also struck up, so as to form a depression, D, into which the plate D' fits. A hollow sleeve, E, projects from this plate outwardly through the back of the disk A, and a plate, F, is screwed upon it closely against that portion of the disk, so that it is clamped firmly between the plates D' and F, and is thus stiffened additionally.

G is a hollow hub closed at one end, and having a stem or spindle, H, projecting from its center, so as to pass through the sleeve E, with a nut, I, upon its outer end to keep the wheel in place. The opposite open end of the hub G is provided with interior screw-threads, J. to fit a faucet or hose-pipe, to which it may be desired to attach the wheel. From opposite sides of the hub G hollow arms K extend, and their ends approach closely to the inside edges of the buckets B, and are bent or are otherwise formed so that the discharge-openings stand in position to deliver the water against the buckets in the most effective manner.

Various nozzles may be screwed upon the arms K, and holes are made in the ends of these pipes, through which the water is delivered against the buckets. The size of these openings will be determined by the pressure of the water in the pipe; but in small wheels for domestic purposes these holes will be very minute, and the wheel driven by the momentum of the water will attain a high velocity with a small expenditure of water. In order to return the water and prevent its being thrown about, and to lead it to a suitable discharge, I inclose the wheel in a case, L. I have shown this case made in two parts, the rim-flanges slipping past each other like the flange of a box-cover. This joint may also be packed by a rubber or other flange, a, to make it water-tight, and it enables me to remove the case at any time for the purpose of inspecting or repairing the wheel. This case is perforated at one side to allow the sleeve E to pass through. The edges of the opening may be turned over inwardly, so as to form a sort of channel or flange, which will carry off any drippings which might run down the inside of the case when it stands with the shaft horizontal.

By means of the long sleeve or box E projecting from the wheel, and the spindle or shaft H, on which it turns, the wheel is allowed to run freely, no packing being necessary where the shaft emerges from the case. Power may be communicated from a pulley, M, upon the sleeve E. The opposite side of the case is perforated to allow the hub G or the water-pipe to enter, and as this is stationary, it may have a washer, N, and a screw-collar, O, to press it against the side of the case, which, in turn, rests against the enlargement of the hub G, and thus makes a tight joint. The case may have an opening, P, at one side of the rim, if the wheel runs in a horizontal position, or at the lower edge, if it runs in a vertical position, for the escape of the water.

This wheel may be used as a fixture, either horizontally or vertically, or it may be temporarily laid upon the edge of a sink or bath-tub, or hung up against a wall, or arranged in any suitable or desired position with a pipe or temporary hose connection while in use, all of which may be detached and removed when not in use.

Having thus described my invention, what I claim as new, and desire to secure by Letters Patent, —

1. A wheel consisting of the disk A, with the buckets B, formed by angular slits in the edge of the disk, and afterward bent at right angles to one side of the disk, and curved or formed substantially as herein described.

2. A wheel consisting of the disk A, buckets B, and the sleeve or box E, together with a hollow stationary hub having a shaft or spindle, H, to fit the sleeve, substantially as herein described.

3. A wheel consisting of the disk A, buckets B, the disk or plate D', with the hollow sleeve or box E projecting from one side, and the flange or disk F, screwed upon the sleeve outside the disk A, so as to clamp it against the inner disk, D', substantially as herein described.

4. The wheel A, with buckets B, sleeve or box E, plates D' and F, and the stationary hollow hub G, with the stem or spindle H, to support the wheel, and water-supply pipes or nozzles K, arranged with relation to the buckets, substantially as herein described.

5. The wheel A, with buckets B, sleeve or box E, plates D' and F, the stationary hollow hub G, with spindle H, and water-supply pipes K, in combination with the case L, fitted tight to the hub and flanged or curved to form a channel around the sleeve E, substantially as herein described.

In witness whereof I have hereunto set my hand.

JAMES H. CULVER.

Witnesses:
  S. H. NOURSE.
  H. C. LEE.